United States Patent
Ichimura et al.

(10) Patent No.: US 12,454,655 B2
(45) Date of Patent: Oct. 28, 2025

(54) LUBRICANT COMPOSITION COMPRISING CARBON NANOTUBES

(71) Applicant: KYODO YUSHI CO., LTD., Fujisawa (JP)

(72) Inventors: Ryosuke Ichimura, Kawasaki (JP); Satoshi Nouyama, Zama (JP); Tomonobu Komoriya, Chigasaki (JP); Makoto Hayama, Fujisawa (JP)

(73) Assignee: KYODO YUSHI CO., LTD., Fujisawa (JP)

( * ) Notice: Subject to any disclaimer, the term of this patent is extended or adjusted under 35 U.S.C. 154(b) by 0 days.

(21) Appl. No.: 18/042,081

(22) PCT Filed: Sep. 30, 2021

(86) PCT No.: PCT/JP2021/036146
§ 371 (c)(1),
(2) Date: Oct. 9, 2023

(87) PCT Pub. No.: WO2022/071491
PCT Pub. Date: Apr. 7, 2022

(65) Prior Publication Data
US 2024/0052255 A1    Feb. 15, 2024

(30) Foreign Application Priority Data
Sep. 30, 2020   (JP) ................. 2020-165157

(51) Int. Cl.
*C10M 125/02*    (2006.01)
*C10M 169/04*    (2006.01)
(Continued)

(52) U.S. Cl.
CPC ........ *C10M 125/02* (2013.01); *C10M 169/04* (2013.01); *C10M 2201/041* (2013.01);
(Continued)

(58) Field of Classification Search
CPC .............. C10M 125/02; C10M 169/04; C10M 2201/041; C10M 2201/1036;
(Continued)

(56) References Cited

U.S. PATENT DOCUMENTS

| | | |
|---|---|---|
| 6,783,746 B1 | 8/2004 | Zhang et al. |
| 2002/0019319 A1 | 2/2002 | Denpo et al. |

(Continued)

FOREIGN PATENT DOCUMENTS

| | | |
|---|---|---|
| EP | 3214160 A1 | 9/2017 |
| EP | 3351325 A1 | 7/2018 |

(Continued)

OTHER PUBLICATIONS

Extended European Search Report dated Jan. 5, 2024, issued by the European Patent Office in corresponding European Application No. 21875787.0 (8 pages).

(Continued)

*Primary Examiner* — Prem C Singh
*Assistant Examiner* — Francis C Campanell
(74) *Attorney, Agent, or Firm* — Panitch Schwarze Belisario & Nadel LLP

(57) ABSTRACT

A lubricant composition comprises a base oil and at least one of carbon nanotubes with a diameter of 0.4 to 9.0 nm in an amount of 0.001 to 0.08% by mass relative to a total mass of the composition, and the composition has a consistency of 200 to 440.

18 Claims, 1 Drawing Sheet

(51) Int. Cl.
    *C10N 20/06*    (2006.01)
    *C10N 30/02*    (2006.01)
    *C10N 30/04*    (2006.01)
    *C10N 30/12*    (2006.01)
    *C10N 40/02*    (2006.01)
(52) U.S. Cl.
    CPC ...... *C10N 2020/06* (2013.01); *C10N 2030/02* (2013.01); *C10N 2030/04* (2013.01); *C10N 2030/12* (2013.01); *C10N 2040/02* (2013.01)
(58) Field of Classification Search
    CPC .... C10M 2207/106; C10M 2207/2805; C10M 2207/289; C10M 2209/103; C10M 2209/109; C10M 2209/126; C10M 2211/003; C10M 2211/006; C10M 2215/042; C10M 2215/1026; C10M 2215/28; C10M 2217/0446; C10M 2219/044; C10M 2223/04; C10M 2223/043; C10M 2229/003; C10M 171/00; C10N 2020/06; C10N 2030/02; C10N 2030/04; C10N 2030/12; C10N 2040/02; C10N 2010/04; C10N 2030/00; C10N 2030/76; C10N 2040/04; C10N 2040/16; C10N 2050/10; F16C 33/6688
    USPC ......................................................... 508/113
    See application file for complete search history.

(56) References Cited

U.S. PATENT DOCUMENTS

| | | |
|---|---|---|
| 2002/0076125 A1 | 6/2002 | Iso et al. |
| 2003/0158047 A1 | 8/2003 | Denpo et al. |
| 2007/0158609 A1 | 7/2007 | Hong et al. |
| 2007/0158610 A1 | 7/2007 | Hong et al. |
| 2009/0131289 A1* | 5/2009 | Zhang .................... B82Y 30/00 977/750 |
| 2009/0176668 A1 | 7/2009 | Shitara et al. |
| 2011/0003721 A1 | 1/2011 | Hong et al. |
| 2011/0046027 A1 | 2/2011 | Zhamu et al. |
| 2011/0224113 A1 | 9/2011 | Pick et al. |
| 2013/0178402 A1 | 7/2013 | Chauveau et al. |
| 2015/0045272 A1* | 2/2015 | Fujimaki ............... C10M 141/06 508/503 |
| 2016/0002562 A1 | 1/2016 | Akao |

FOREIGN PATENT DOCUMENTS

| | | |
|---|---|---|
| EP | 3495464 A1 | 6/2019 |
| JP | 2002195277 A | 7/2002 |
| JP | 2002332490 A | 11/2002 |
| JP | 2004123954 A | 4/2004 |
| JP | 2005325310 A | 11/2005 |
| JP | 2008223902 A | 9/2008 |
| JP | 2010112490 A | 5/2010 |
| JP | 2013538914 A | 10/2013 |
| JP | 2018090717 A | 6/2018 |
| JP | 2018104651 A | 7/2018 |
| WO | 2007116642 A1 | 10/2007 |
| WO | 2014115603 A1 | 7/2014 |
| WO | 2016068219 A1 | 5/2016 |
| WO | 2017047551 A1 | 3/2017 |

OTHER PUBLICATIONS

International Search Report (PCT/ISA/210) with an English translation, and Written Opinion (PCT/ISA/237) mailed on Dec. 21, 2021, by the Japan Patent Office as the International Searching Authority for International Application No. PCT/JP2021/036146. (14 pages).

Vakili-Nezhaad et al., "Effect of Single-Walled Carbon Nanotube on the Viscosity of Lubricants", SciVerse ScienceDirect, Energy Procedia, 2012, vol. 14, pp. 512-517.

Pena-Paras et al., "Antiwear and Extreme Pressure Properties of Nanofluids for Industrial Applications", Tribology & Lubrication Technology, Jun. 9, 2014, vol. 70, No. 12, pp. 74-76, 78-79.

Office Action issued on Jan. 20, 2025, by the Korean Patent Office in corresponding KR Application No. 10-2023-7007173, and English translation of the Office Action.

Office Action issued on Oct. 31, 2024, by the State Intellectual Property Office of People's Republic of China in corresponding CN Application No. 202180066290.8, and English translation of the Office Action (14 pages).

Office Action issued Aug. 4, 2025, by the Japanese Patent Office in corresponding JP Application No. 2022-554098, and English translation of the Office Action (14 pages).

Office Action issued Jul. 12, 2025, by the State Intellectual Property Office of People's Republic of China in corresponding CN Application No. 202180066290.8, and English translation of the Office Action (19 pages).

* cited by examiner

LUBRICANT COMPOSITION COMPRISING CARBON NANOTUBES

TECHNICAL FIELD

The present invention relates to a lubricant composition suitably usable for rolling bearings, particularly rolling bearings for motors.

BACKGROUND ART

Lubricated surfaces of steels are known to be damaged due to electricity. For example, a bearing receives damage called an electrolytic corrosion, which occurs due to electric discharge caused with application of a voltage between a rotating shaft and the bearing. The electrolytic corrosion occurs in a bearing when there is a potential difference between an inner ring and an outer ring of the bearing or when a common mode current flows. More specifically, in a lubricating film interposed between the balls and the race surfaces of the bearing, electric discharge continues and thereby develops into an electrolytic corrosion.

Patent Literature 1 has objects to provide a conductive grease that has excellent conductivity and is less prone to deterioration in conductivity over time, and provide a rolling device that has such a low electrical resistance value as to be hardly electrified over a long period of time, and provides a conductive grease comprising carbon nanotubes as a conductivity-imparting additive. The electrical resistance value of the bearing is decreased by using this grease.

CITATION LIST

Patent Literature

Patent Literature 1: Japanese Patent Application Publication No. 2002-332490

SUMMARY OF INVENTION

Problem to be Solved by the Invention

The present invention has an object to provide a lubricant composition capable of preventing an electrolytic corrosion by preventing electric discharge.

Means for Solution of the Problem

The present invention provides lubricant compositions to be described below.
1. A lubricant composition comprising:
   a base oil; and
   at least one of carbon nanotubes with a diameter of 0.4 to 9.0 nm in an amount of 0.001 to 0.08% by mass relative to a total mass of the composition,
   wherein the composition has a consistency of 200 to 440.
2. A lubricant composition comprising:
   a base oil;
   at least one of carbon nanotubes with a diameter of 0.4 to 9.0 nm in an amount of 0.001 to 3% by mass relative to a total mass of the composition; and
   a dispersant in an amount of more than 0% by mass and not more than 10% by mass relative to the total mass of the composition,
   wherein the composition has a consistency of 200 to 440.
3. The lubricant composition according to the above 2, wherein the dispersant is an oiliness dispersant.
4. The lubricant composition according to the above 3, wherein the dispersant is at least one selected from the group consisting of phosphate esters or salts thereof, polyether ester acid or salts thereof, sulfonic acid or salts thereof, succinimide, sorbitan esters, and polyalkylene glycols.
5. The lubricant composition according to any one of the above 1 to 4, wherein the carbon nanotubes are single-walled or double-walled.
6. The lubricant composition according to any one of the above 1 to 5, wherein the base oil comprises at least one selected from the group consisting of mineral oils, synthetic hydrocarbon oils, phenyl ether oils, alkylbenzene oils, ester oils, polyglycol oils, silicone oils, fluorine oils, and ionic liquids.
7. The lubricant composition according to any one of the above 1 to 6, further comprising a thickener.
8. The lubricant composition according to the above 7, wherein the thickener comprises at least one selected from the group consisting of soap-based thickeners, complex soap-based thickeners; urea-based thickeners; urethane-based thickeners; Na terephthalamate; organically modified bentonite; silica gel; fluorine-based powder; fibrous cellulose; and aramid fiber.
9. The lubricant composition according to any one of the above 1 to 6, not comprising a thickener.
10. The lubricant composition according to any one of the above 1 to 9, which is for use in an automobile part, industrial machinery, or a bearing.
11. An automobile part, industrial machinery, or a bearing in which the composition according to any one of the above 1 to 10 is enclosed.

Advantageous Effects of Invention

According to a composition of the present invention, the lubricant composition comprises carbon nanotubes having an electric discharge suppressing effect, so that electric discharge of the lubricant composition can be suppressed to prevent an electrolytic corrosion on lubricated surfaces. The composition of the present invention is also excellent in acoustic performance, and exhibits the electric discharge suppressing effect and the acoustic performance in a good balance. The composition of the present invention comprising a dispersant makes it possible to maintain the electric discharge suppressing effect of the carbon nanotubes for a longer period of time.

DESCRIPTION OF EMBODIMENTS (Lubricant Composition)

Figure 1:
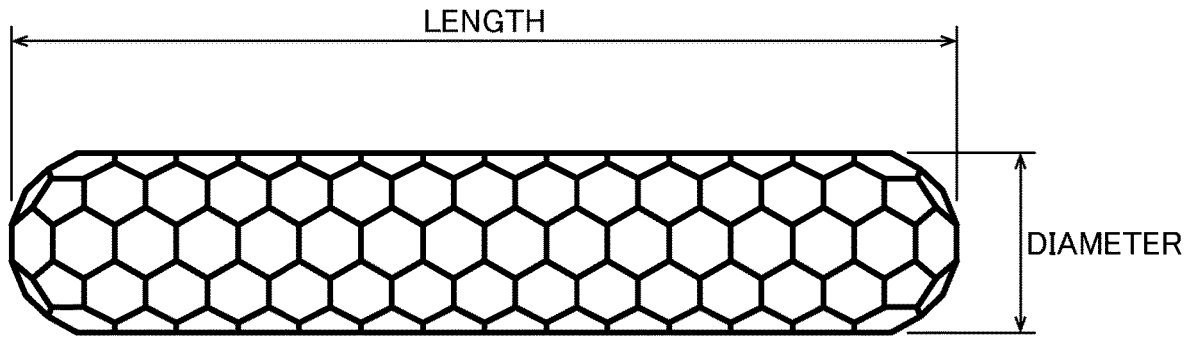
FIG. 1 is a schematic diagram illustrating a whole structure of a carbon nanotube.

A lubricant composition of a first embodiment of the present invention comprises a base oil and at least one of carbon nanotubes with a diameter of 0.4 to 9.0 nm in an amount of 0.001 to 0.08% by mass relative to a total mass of the composition, wherein the composition has a consistency of 200 to 440. If a base oil with a high kinematic viscosity is used, a composition with a consistency of 200 to 440 can be obtained from only two types, namely, the base oil and the carbon nanotubes in a predetermined size. Alternatively, a composition with a consistency of 200 to 440 can be obtained using a base oil with a low kinematic viscosity if the composition comprises a conventional thickener and/or a conventional solid lubricant. In either case, the composition may comprise an additive.

A lubricant composition of a second embodiment of the present invention comprises a base oil, at least one of carbon nanotubes with a diameter of 0.4 to 9.0 nm in an amount of 0.001 to 3% by mass relative to a total mass of the composition, and a dispersant in an amount of more than 0% by mass and not more than 10% by mass relative to the total mass of the composition, wherein the composition has a consistency of 200 to 440. In general, when a lubricant composition is used for a long period of time in a mechanical part, shear applied to the lubricant composition changes the state of dispersion of the carbon nanotubes in the lubricant composition. As a result, the electric discharge suppressing effect is also changed. In the lubricant composition of the second embodiment, the lubricant composition of the first embodiment comprises a certain amount of dispersant, which makes it possible to maintain the electric discharge suppressing effect of the carbon nanotubes for a longer period of time even when the amount of the carbon nanotubes is larger than in the first embodiment.

In the following description, simple expression of "composition" or "lubricant composition" means both the lubricant composition of the first embodiment and the lubricant composition of the second embodiment.

<Base Oil>

A base oil usable in the composition of the present invention is not particularly limited and any mineral oil and/or synthetic oil may be used. Examples of the base oil include mineral oils, synthetic hydrocarbon oils; phenyl ether oils such as pentaphenyl ether, tetraphenyl ether, monoalkyl tetraphenyl ether, dialkyl tetraphenyl ether, and alkyl diphenyl ether oils; alkylbenzene oils; ester oils such as monoester oils, diester oils, polyol ester oils, and aromatic ester oils; polyglycol oils; silicone oils; fluorine oils; and ionic liquids.

From the viewpoint of low-temperature fluidity, the composition comprises, as the base oil, preferably a synthetic oil, more preferably a synthetic hydrocarbon oil, an alkyl diphenyl ether oil, a diester oil, or a polyol ester oil, further preferably a synthetic hydrocarbon oil and/or an alkyl diphenyl ether oil, and particularly preferably a poly-α-olefin and/or an alkyl diphenyl ether oil. When the base oil comprises another base oil, the amount of the poly-α-olefin and the alkyl diphenyl ether oil is preferably 35% by mass or more relative to the total mass of the base oil from the viewpoint of thermostability. The base oil is further particularly preferably a mixture oil of the poly-α-olefin and the alkyl diphenyl ether oil. In this case, from the viewpoint of a balance between the low-temperature fluidity and the thermostability, it is especially preferable that a mass ratio between the poly-α-olefin and the alkyl diphenyl ether oil (poly-α-olefin:alkyl diphenyl ether oil) be 20:80 to 70:30.

When the composition of the present invention does not comprise a thickener and/or a solid lubricant, the consistency of the present invention is determined mainly depending on the kinematic viscosity of the base oil and the content of the carbon nanotubes in the case of the first embodiment and is determined mainly depending on the kinematic viscosity of the base oil, the content of the carbon nanotubes, and the content of the dispersant in the case of the second embodiment. In the case of the first embodiment, for example, the consistency is 200 when 0.001% by mass of carbon nanotubes are added to a base oil with a kinematic viscosity at 40° C. of 3,000,000 mm$^2$/s, whereas the consistency is 440 when 0.001% by mass of carbon nanotubes are added to a base oil with a kinematic viscosity at 40° C. of 15,000 mm$^2$/s. In the case of the second embodiment, for example, the consistency is 200 when 0.001% by mass of carbon nanotubes and 0.001% by mass of a dispersant are added to a base oil with a kinematic viscosity at 40° C. of 3,000,000 mm$^2$/s, whereas the consistency is 440 when 0.001% by mass of carbon nanotubes and 0.001% by mass of a dispersant are added to a base oil with a kinematic viscosity at 40° C. of 15,000 mm$^2$/s. In the case where the composition of the present invention does not comprise a thickener and/or a solid lubricant, the kinematic viscosity at 40° C. of the base oil of the present invention, for example, for bearing application is preferably 200,000 to 3,000,000 mm$^2$/s, more preferably 350,000 to 3,000,000 mm$^2$/s, and further preferably 500,000 to 1,900,000 mm$^2$/s. Then, the kinematic viscosity at 40° C. for rolling roll application is preferably 55,000 to 500,000 mm$^2$/s, more preferably 90,000 to 350,000 mm$^2$/s, and further preferably 140,000 to 200,000 mm$^2$/s. Meanwhile, the kinematic viscosity at 40° C. for reduction gear application is preferably 15,000 to 200,000 mm$^2$/s, more preferably 18,000 to 110,000 mm$^2$/s, and further preferably 23,000 to 55,000 mm$^2$/s.

In the case where the composition of the present invention comprises a thickener and/or a solid lubricant, the kinematic viscosity at 40° C. of the base oil of the present invention is preferably 20 to 220 mm$^2$/s. The kinematic viscosity at 40° C. of the base oil of 20 mm$^2$/s or higher to 220 mm$^2$/s or smaller is preferable because the low torque performance and evaporation resistance (thermostability) can be both achieved. For the same reason, the kinematic viscosity at 40° C. is more preferably 20 to 200 mm$^2$/s, further preferably 20 to 180 mm$^2$/s, and more preferably 20 to 140 mm$^2$/s.

The kinematic viscosity of the base oil can be measured based on JIS K2283.

In the case where the composition of the present invention does not comprise a thickener and/or a solid lubricant, the content of the base oil is the remainder.

In the case where the composition of the first embodiment of the present invention comprises a thickener, the content of the base oil based on the total mass of the composition is preferably 70 to 95% by mass, more preferably 75 to 92% by mass, further preferably 78 to 90% by mass, and particularly preferably 79.92 to 87.95% by mass (for example, 80 to 87% by mass) from the viewpoint of lubricity.

In the case where the composition of the second embodiment of the present invention comprises a thickener, the content of the base oil based on the total mass of the composition is preferably 70 to 95% by mass, more preferably 75 to 92% by mass, and further preferably 78 to 90% by mass from the viewpoint of lubricity.

In the case where the composition of the first embodiment of the present invention comprises a solid lubricant, the content of the base oil based on the total mass of the composition is preferably 69.92 to 99.899% by mass (for example, 70 to 99% by mass), more preferably 79.92 to 99.495% by mass (for example, 80 to 98% by mass), further preferably 84.92 to 98.99% by mass (for example, 85 to 97% by mass), and particularly preferably 89.92 to 94.95% by mass (for example, 90 to 94% by mass) from the viewpoint of lubricity.

In the case where the composition of the second embodiment of the present invention comprises a solid lubricant, the content of the base oil based on the total mass of the composition is preferably 70 to 99% by mass, more preferably 80 to 98% by mass, further preferably 85 to 97% by mass, and particularly preferably 90 to 94% by mass from the viewpoint of lubricity.

<Carbon Nanotubes>

The carbon nanotube is a tube made by stacking graphite-like carbon, and both ends of each layer are closed like fullerenes. The schematic whole structure is as illustrated in FIG. 1.

The minimum value of the diameter ("D") of a carbon nanotube that has been reported so far is 0.4 nm (Lu-Chang Qin et al., "The smallest carbon nanotube", Nature, 408, 50 (2000)). In the present invention, carbon nanotubes with a diameter of 0.4 nm or smaller are usable. On the other hand, since a high content of carbon nanotubes in the composition leads to an increase in the torque, it is preferable that the content of carbon nanotubes in the composition be as low as possible. When the composition comprises carbon nanotubes with a diameter of 9.0 nm or smaller, even a small amount of the carbon nanotubes can exhibit a sufficient electric discharge suppressing effect and effectively suppress an electrolytic corrosion. The composition of the present invention preferably comprises carbon nanotubes with a diameter of 0.7 to 5.0 nm. When the composition of the present invention comprises 0.001 to 0.08% by mass of at least one of carbon nanotubes with a diameter of 0.4 to 9.0 nm, the composition of the present invention may comprise carbon nanotubes with a diameter exceeding 9.0 nm. However, when the diameter exceeds 9.0 nm, multi-walled carbon nanotubes having three or more layers account for a large proportion and tend to cause electric discharge. For this reason, from the viewpoint of electrolytic corrosion suppression, it is preferable that the composition of the present invention should not comprise carbon nanotubes with a diameter of 9.0 nm or larger.

The length of the carbon nanotube is not particularly limited. For example, carbon nanotube with a length of 5 µm or longer to 600 µm or shorter may be used.

As illustrated in FIG. 1, the diameter of a carbon nanotube refers to a short side in a plan view, whereas the length of the carbon nanotube refers to a longitudinal side in the plan view. The diameter and the length of the carbon nanotube can be measured by using a transmission electron microscope.

The diameter of carbon black used in the related art is at least 10 nm and carbon black with a diameter comparable to that of carbon nanotubes does not currently exist. In order to suppress electric discharge when CB is used, it is considered necessary to form a structural body called a structure in which carbon black particles are continuously connected to each other. Since carbon black particles have to be in physical contact with each other in order to form the structure, a large amount (for example, 10% by mass) of carbon black has to be contained. However, when a large amount of carbon black is contained, the acoustic performance will be degraded.

In general, there are single-walled and double-walled carbon nanotubes and multi-walled carbon nanotubes having three or more layers. Among them, single-walled or double-walled carbon nanotubes are preferable as carbon nanotubes for use in the lubricant composition of the present invention from the viewpoint of the electric discharge suppressing effect. It is preferable that the lubricant composition of the present invention comprise substantially no multi-walled carbon nanotubes having three or more layers. For example, the content of such carbon nanotubes based on the total mass of the composition is preferably 3% by mass or less, more preferably 2% by mass, and further preferably 1% by mass or less.

The carbon nanotube may have an active site on its surface, at least part of which may be modified by OH, CH, CHO, or the like. However, as the carbon nanotubes used in the present invention, unmodified carbon nanotubes are preferable because of high affinity with the base oil.

The content of the carbon nanotubes in the lubricant composition of the first embodiment of the present invention based on the total mass of the composition is 0.001 to 0.08% by mass. The content is preferably 0.005 to 0.08% by mass, more preferably 0.01 to 0.08% by mass, and further preferably 0.05 to 0.08% by mass. The content of the carbon nanotubes within the above range is preferable because the composition can exhibit the electric discharge suppressing effect and the acoustic performance in a good balance. When the lubricant composition of the first embodiment of the present invention is used as a grease composition for motor bearings, it is preferable to set the content of carbon nanotubes to 0.08% by mass or less because appropriate consistency can be obtained.

The content of the carbon nanotubes in the lubricant composition of the second embodiment of the present invention based on the total mass of the composition is 0.001 to 3% by mass. The content is preferably 0.01 to 2% by mass, more preferably 0.05 to 1% by mass, and further preferably 0.08 to 1% by mass. The content of the carbon nanotubes within the above range is preferable because the composition can exhibit the electric discharge suppressing effect and the acoustic performance in a good balance. When the lubricant composition of the second embodiment of the present invention is used as a grease composition for motor bearings, it is preferable to set the content of carbon nanotubes to 0.08 to 1% by mass because appropriate consistency can be obtained.

<Dispersant>

The dispersant which the lubricant composition of the second embodiment of the present invention may comprise serves to disperse the carbon nanotubes in the lubricant composition. As described above, in general, when a lubricant composition is used for a long period of time in a mechanical part, shear applied to the lubricant composition changes the state of dispersion of the carbon nanotubes in the lubricant composition and the electric discharge suppressing effect of the carbon nanotubes is also changed. The lubricant composition of the second embodiment comprises a certain amount of a dispersant, which makes it possible to maintain the electric discharge suppressing effect of the carbon nanotubes for a longer period of time even when the amount of the carbon nanotubes is larger than in the first embodiment.

The dispersant usable in the present invention is preferably an oiliness dispersant, Specific examples of the oiliness dispersant include phosphate esters or salts thereof, polyether ester acid or salts thereof, sulfonic acid or salts thereof, alkenylsuccinimide, sorbitan esters, and polyalkylene glycol derivatives.

The phosphate esters or salts thereof include phosphate esters or sodium salts thereof, and the like. The phosphate ester may have a functional group such as an amino group. A phosphate ester is preferable.

The polyether ester acid or salts thereof include polyether ester acid or amine salts thereof, and the like. An amine salt of polyether ester acid is preferable.

The sulfonic acid or salts thereof include alkylaromatic sulfonic acid, lithium alkylaromatic sulfonate, sodium alkylaromatic sulfonate, calcium alkylaromatic sulfonate, zinc alkylaromatic sulfonate, barium alkylaromatic sulfonate, amine salt of alkylaromatic sulfonate, petroleum sulfonic acid, lithium petroleum sulfonate, sodium petroleum sulfonate, calcium petroleum sulfonate, zinc petroleum sulfonate, barium petroleum sulfonate, amine salt of petroleum sulfonate, and the like. Among them, calcium alkylaromatic sulfonate, zinc alkylaromatic sulfonate, calcium petroleum sulfonate, and zinc petroleum sulfonate are preferable, calcium alkylaromatic sulfonate and zinc alkylaromatic sulfonate are more preferable, and calcium dinonylnaphthalene sulfonate and zinc dinonylnaphthalene sulfonate are further preferable.

The succinimide includes alkenylsuccinimide, polyalkylene succinimide, boron-modified succinimide, and the like. Among them, alkenylsuccinimide or polyalkylene succinimide is preferable.

The sorbitan esters include sorbitan monooleate, sorbitan trioleate, sorbitan tristearate, sorbitan distearate, sorbitan monostearate, sorbitan triisostearate, sorbitan diisostearate, sorbitan monoisostearate, sorbitan trilaurate, sorbitan dilaurate, sorbitan monolaurate, and the like. Among them, sorbitan monooleate and sorbitan trioleate are preferable and sorbitan trioleate is more preferable.

The polyalkylene glycols include: polyalkylene glycols such as polypropylene glycol and copolymers of polypropylene glycol-polyethylene glycol; polyalkylene glycol monoalkyl ethers such as polyalkylene glycol monomethyl ether and polyalkylene glycol monobutyl ether; polyalkylene glycol dialkyl ether such as polyalkylene glycol dimethyl ether, and polyalkylene glycol dibutyl ether; amino group-containing polyalkylene glycol, succinimidyl group-containing polyalkylene glycol, carboxy group-containing polyalkylene glycol, phosphine group-containing polyalkylene glycol, thiol group-containing polyalkylene glycol, sulfonyl group-containing polyalkylene glycol, amino group-containing polyalkylene glycol, succinimidyl group-containing polyalkylene glycol, maleimidyl group-containing polyalkylene glycol, and the like. Among them, amino group-containing polyalkylene glycol, succinimidyl group-containing polyalkylene glycol, and maleimidyl group-containing polyalkylene glycol are preferable and amino group-containing polyalkylene glycol is more preferable.

The dispersant used in the lubricant composition of the second embodiment of the present invention is preferably a phosphate ester, an amine salt of polyether ester acid, succinimide, or amino group-containing polyalkylene glycol. A phosphate ester is more preferable. A phosphate ester and an amine salt of polyether ester acid are particularly preferable because they have a high ability to maintain the electric discharge suppressing effect of carbon nanotubes for a longer period of time.

The content of the dispersant in the lubricant composition of the second embodiment of the present invention based on the total mass of the composition is more than 0% by mass and not more than 10% by mass. The lubricant composition comprising the above content of the dispersant is preferable because it is possible to maintain the electric discharge suppressing effect of the carbon nanotubes for a longer period of time and to obtain appropriate consistency. The content is preferably 0.05 to 5% by mass and more preferably 0.08 to 1% by mass. In order to sufficiently maintain the dispersiveness of the carbon nanotubes, the content of the dispersant relative to the total mass of the carbon nanotubes is preferably 30 to 9900% by mass. The content is more preferably 50 to 3000% by mass and further preferably 80 to 1250% by mass.

The state of the composition of the present invention is pasty in the case where the composition does not comprise a thickener (specifically, comprises neither a thickener nor a solid lubricant or comprises only a solid lubricant without comprising a thickener), or is pasty or semi-solid or solid (in other words, grease-like) in the case where the composition comprises a thickener (specifically, comprises both of a thickener and a solid lubricant or comprises only a thickener without comprising a solid lubricant).

The term "consistency" usually indicates the apparent hardness of a grease, and refers to a numerical value of 10 times a depth (mm) of penetration of a specified cone into a sample ("Tribology Dictionary" edited by the Japan Society of Tribologists, Yokendo Ltd., Mar. 1, 2007). In the present specification, the consistency is a numerical value applicable to not only a grease (specifically, a lubricant that comprises a base oil and a thickener and may comprise an additive as needed) but also a pasty lubricant that comprises no thickener. In the present specification, the consistency refers to a 60-stoke worked penetration that can be determined in accordance with JIS K 2220. For example, the consistency for bearing application is preferably 320 or less, more preferably 200 to 320, and further preferably 200 to 300. When the lubricant composition of the present invention is used as a grease composition for motor bearings, the consistency is preferably 220 to 280. The consistency for rolling mill rolls is preferably 280 to 380, more preferably 300 to 360, and further preferably 320 to 340. The consistency for reduction gears is preferably 320 to 440, more preferably 350 to 430, and further preferably 380 to 420.

(Grease Composition)
<Thickener>

In the case where the lubricant composition of the present invention is used for bearings, it is preferable to form a grease composition in which the lubricant composition comprises a thickener from the viewpoint of oil retention and thermostability.

For example, the thickener usable in the present invention is at least one selected from the group consisting of soap-based thickeners such as Li soap and Ca soap; complex soap-based thickeners such as Li complex soap, Ca complex soap, Ca sulfonate complex soap, and Al complex soap; urea-based thickeners such as diurea, triurea, and tetraurea; urethane-based thickeners such as urethane; Na terephthalamate; organically modified bentonite; fluorine-based powder represented by PTFE (polytetrafluoroethylene); fibrous cellulose; and aramid fiber.

In the case where the grease composition of the present invention is used for bearings, in particular, motor bearings, the thickener preferably comprises Li soap or a urea compound and more preferably is a urea compound from the viewpoint of low torque.

As the urea compound, a diurea compound is preferable from the viewpoint of thermostability. As the diurea compound, a diurea compound expressed by the following formula (1) is preferable.

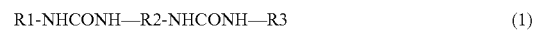

R1-NHCONH—R2-NHCONH—R3 (1)

In the formula, R2 is a divalent aromatic hydrocarbon group having 6 to 15 carbon atoms, and R1 and R3, which may be the same or different, are each a saturated or unsaturated alkyl group having 6 to 30 carbon atoms, an aryl group having 6 or 7 carbon atoms, or a cyclohexyl group.

As the diurea compound of the formula (1), an aliphatic diurea compound in which both R1 and R3 are alkyl groups having 6 to 30 carbon atoms is preferable. The aliphatic diurea compound can be obtained through a reaction of diisocyanate and aliphatic monoamine.

As the diurea compound of the formula (1), an alicyclic diurea compound in which both R1 and R3 are cyclohexyl groups is preferable. The alicyclic diurea compound can be obtained through a reaction of diisocyanate and cyclohexylamine.

As the diurea compound of the formula (1), an alicyclic aliphatic diurea compound in which any one of R1 and R3 is an alkyl group having 6 to 30 carbon atoms and the other one is a cyclohexyl group is preferable. Since the alicyclic aliphatic diurea compound can be obtained through a reaction of diisocyanate with alicyclic monoamine and aliphatic monoamine, the alicyclic aliphatic diurea compound in fact is not only an alicyclic aliphatic diurea compound but also a mixture comprising an aliphatic diurea compound and an alicyclic diurea compound.

Among the diurea compounds of the formula (1), the alicyclic aliphatic diurea compound is preferable from the viewpoint of low torque.

In the case where any one of R1 and R3 is a cyclohexyl group, the other one is preferably a saturated linear alkyl group having 8 or 18 carbon atoms. In this compound, a ratio of the cyclohexyl group to the total of the cyclohexyl group and the alkyl group is preferably 10 to 90 mol %, more preferably 30 to 90 mol %, and particularly preferably 30 to 88 mol % from the viewpoint of adhesiveness of the grease.

R2 is preferably tolylene diisocyanate or diphenylmethane diisocyanate and more preferably diphenylmethane diisocyanate.

In particular, in the case of a diurea compound of the formula (1) in which any one of R1 and R3 is a cyclohexyl group and the other one is a saturated linear alkyl group having 8 or 18 carbon atoms, R2 is diphenylmethane diisocyanate, the diurea compound in which the ratio of the cyclohexyl group to the total of the cyclohexyl group and the alkyl group is 10 to 90 mol % is preferable, and the diurea compound in which the ratio is 30 to 88 mol % is more preferable.

In the case where the composition of the first embodiment of the present invention does not comprise a solid lubricant, the content of the thickener based on the total mass of the composition is preferably 3 to 40% by mass such that the consistency of the composition of the present invention can be set to 200 to 440. The content of the thickener is more preferably 5 to 30% by mass, further preferably 8 to 20% by mass, and particularly preferably 12 to 20% by mass.

In the case where the composition of the second embodiment of the present invention does not comprise a solid lubricant, the content of the thickener based on the total mass of the composition is preferably 3 to 40% by mass such that the consistency of the composition of the present invention can be set to 200 to 440. The content of the thickener is more preferably 5 to 30% by mass and further preferably 8 to 20° % by mass.

Note that, when the lubricant composition of the present invention is in the form of a grease composition, the composition of the present invention is neither a so-called thermal grease nor a so-called oil compound containing a filler such as silica resin powder or a metal oxide.

<Solid Lubricant>

As a solid lubricant usable in the present invention, there are melamine cyanurate, graphite, onion-like carbon, nanodiamond, graphite fluoride, black silica, granular polyethylene, granular polypropylene, polyethylene wax, polypropylene wax, oxidized polyethylene wax, ester wax, montanic acid wax, amide wax, spherical alumina, zinc oxide, mica, molybdenum disulfide, tungsten disulfide, calcium carbonate, boron nitride, metal powders such as copper and nickel, and the like.

Among them, melamine cyanurate, polyethylene wax, polypropylene wax, oxidized polyethylene wax, ester wax, montanic acid wax, and amide wax are preferable, melamine cyanurate, polyethylene wax, polypropylene wax, oxidized polyethylene wax, and ester wax are more preferable, and melamine cyanurate, polyethylene wax, and polypropylene wax are further preferable.

In the case where the composition of the first embodiment of the present invention does not comprise a thickener, the content of the solid lubricant based on the total mass of the composition is preferably 0.1 to 30% by mass such that the consistency of the composition can be set to 200 to 440. The content of the solid lubricant is more preferably 0.5 to 20% by mass, further preferably 1 to 15% by mass, and particularly preferably 5 to 10% by mass.

In the case where the composition of the second embodiment of the present invention does not comprise a thickener, the content of the solid lubricant based on the total mass of the composition is preferably 0.1 to 30% by mass such that the consistency of the composition can be set to 200 to 440. The content of the solid lubricant is more preferably 0.5 to 20% by mass, further preferably 1 to 15% by mass, and particularly preferably 5 to 10% by mass.

The solid lubricant may be used as an additive rather than for thickening purposes. In this case, the content of the solid lubricant in the composition of the present invention is the same as a content of an optional component to be described below.

<Optional Components>

The lubricant composition of the present invention may further comprise an additive such as an oily agent, an anti-wear agent, an extreme pressure additive, a rust inhibitor, a non-ferrous metal corrosion inhibitor, or an antioxidant. However, it is preferable that the lubricant composition of the present invention should not comprise any dispersion medium other than the base oil, such as water and/or a water-soluble organic solvent. It is also preferable that the lubricant composition should not comprise a silica resin powder or an epoxy resin powder to be used as a filler for an oil compound.

The content of the above additive based on the total mass of the lubricant composition is usually 0.01 to 15% by mass, preferably 0.05 to 12% by mass, and more preferably 0.1 to 10% by mass.

As the oily agent, there are lanolin, methyl oleate, monoester of polyethylene glycol monooleate, diesters including bis(2-ethylhexyl) adipate and bis(2-ethylhexyl) sebacate, and the like.

As the anti-wear agent, there are phosphite esters including triphenyl phosphite and triethylphosphite, glycerol fatty acid esters including glycerol monocaprate and glycerol monostearate, and the like.

As the extreme pressure additive, there are sulfurized oils and fats, sulfurized olefins, polysulfides, ashless dithiocarbamate, trioctyl phosphate, tricresyl phosphate, triphenylphosphorothionate, dialkyldithiocarbamates including zinc dialkyldithiocarbamate and molybdenum dialkyldithiocarbamate, dialkyldithiophosphates including zinc dialkyldithiophosphate and molybdenum dialkyldithiophosphate, and the like.

As the rust inhibitor, there are inorganic rust inhibitors and organic rust inhibitors. As the inorganic rust inhibitors, there are inorganic metal salts such as sodium silicate, lithium carbonate, potassium carbonate, and zinc oxide. As the organic rust inhibitors, there are benzoates including sodium benzoate and lithium benzoate, carboxylates including zinc naphthenate and sodium sebacate, succinic acid, succinic acid derivatives including succinic anhydride and succinic acid half ester, and fatty acid amine salts.

As the non-ferrous metal corrosion inhibitor, there are benzotriazole or derivatives thereof, benzothiazole or derivatives thereof, thiadiazole or derivatives thereof, and the like.

The antioxidant is known to inhibit oxidative degradation of a grease, and there are phenol-based antioxidants and amine-based antioxidants.

The phenol-based antioxidants include 2,6-di-tert-butyl-p-cresol (BHT), 2,2'-methylenebis(4-methyl-6-tert-butylphenol), 4,4'-butylidenebis(3-methyl-6-tert-butylphenol), 2,6-di-tert-butyl-phenol, 2,4-dimethyl-6-tert-butylphenol, tert-butylhydroxyanisole (BHA), 4,4'-butylidenebis(3-methyl-6-tert-butylphenol), 4,4'-methylenebis(2,3-di-tert-butylphenol), 4,4'-thiobis(3-methyl-6-tert-butylphenol), octadecyl-3-(3,5-di-tert-butyl-4-hydroxyphenyl)propionate, and the like. Among them, octadecyl-3-(3,5-di-tert-butyl-4-hydroxyphenyl)propionate is preferable.

The amine-based antioxidants include N-n-butyl-p-aminophenol, 4,4'-tetramethyl-di-aminodiphenylmethane, α-naphthylamine, N-phenyl-α-naphthylamine, phenothiazine, alkyldiphenylamine, and the like. Among them, alkyldiphenylamine is preferable.

It is preferable to contain N-phenyl-α-naphthylamine, alkyldiphenylamine, and/or octadecyl-3-(3,5-di-tert-butyl-4-hydroxyphenyl)propionate among them, because they can extend the seizure life of a bearing. In particular, it is preferable to contain alkyldiphenylamine and/or octadecyl-3-(3,5-di-tert-butyl-4-hydroxyphenyl)propionate. Furthermore, it is particularly preferable to contain alkyldiphenylanine and octadecyl-3-(3,5-di-tert-butyl-4-hydroxyphenyl) propionate in an amount of 0.1 to 6% by mass based on the total mass of the composition.

In particular, the composition of the first embodiment of the present invention is preferably a composition comprising:
 a base oil having a kinematic viscosity at 40° C. of 15,000 to 3,000.000 mm$^2$/s; and
 at least one of carbon nanotubes (for example, single-walled or double-walled carbon nanotubes, in particular, single-walled carbon nanotubes) with a diameter of 0.4 to 9.0 nm in an amount of 0.001 to 0.08% by mass relative to the total mass of the composition,
 wherein the composition may further comprise an additive but comprises neither a thickener nor a solid lubricant, and
 the composition has a consistency of 200 to 440.

In this composition, it is preferable that the content of the base oil be 89.2 to 99.999% by mass (for example, 90 to 99% by mass) and the content of the additive be 0 to 10% by mass.

In particular, the composition is more preferably a lubricant composition for motor bearings having a consistency of 220 to 280.

Also, the composition of the first embodiment of the present invention is preferably a composition comprising:
 a base oil having a kinematic viscosity at 40° C. of 20 to 140 mm$^2$/s;
 at least one of carbon nanotubes (for example, single-walled or double-walled carbon nanotubes, in particular, single-walled carbon nanotubes) with a diameter of 0.4 to 9.0 nm in an amount of 0.001 to 0.08% by mass relative to the total mass of the composition; and
 a diurea compound of the formula (1) as a thickener, in which any one of R1 and R3 is a cyclohexyl group and the other one is a saturated linear alkyl group having 8 or 18 carbon atoms, R2 is diphenylmethane diisocyanate, and a ratio of the cyclohexyl group to the total of the cyclohexyl group and the alkyl group is 30 to 88 mol %,
 wherein the composition may further comprise an additive, and
 the composition has a consistency of 200 to 440.

In this composition, it is preferable that the content of the base oil be 70 to 94.92% by mass (for example, 70 to 94% by mass), the content of the thickener be 5 to 20%, and the content of the additive be 0 to 10% by mass.

In particular, the composition is more preferably a lubricant composition for motor bearings having a consistency of 220 to 280.

It is preferable to contain an antioxidant, in particular, an amine-based antioxidant as the additive, because it can extend the seizure life.

In particular, the composition of the first embodiment of the present invention is also preferably a composition comprising:
 a base oil having a kinematic viscosity at 40° C. of 20 to 140 mm$^2$/s;
 at least one of carbon nanotubes (for example, single-walled or double-walled carbon nanotubes, in particular, single-walled carbon nanotubes) with a diameter of 0.4 to 9.0 nm in an amount of 0.001 to 0.08% by mass relative to the total mass of the composition; and
 at least one selected from the group consisting of melamine cyanurate, polyethylene wax, and polypropylene wax as a solid lubricant, wherein
 the composition may further comprise an additive, and
 the composition has a consistency of 200 to 440.

In this composition, it is preferable that the content of the base oil be 60 to 89.92% by mass (for example, 60 to 90% by mass), the content of the solid lubricant be 10 to 30%, and the content of the additive be 0 to 10% by mass.

In particular, the composition is more preferably a lubricant composition for motor bearings having a consistency of 220 to 280.

In particular, the composition of the second embodiment of the present invention is preferably a grease composition comprising:
 a base oil having a kinematic viscosity at 40° C. of 15,000 to 3,000,000 mm$^2$/s;
 at least one of carbon nanotubes (for example, single-walled or double-walled carbon nanotubes, in particular, single-walled carbon nanotubes) with a diameter of 0.4 to 9.0 nm in an amount of 0.001 to 3% by mass relative to the total mass of the composition;
 at least one dispersant selected from the group consisting of phosphate esters and amine salts of polyether ester acid in an amount of 0.08 to 1% by mass relative to the total mass of the composition, and
 a thickener, wherein
 the composition may further comprise an additive, and
 the composition has a consistency of 200 to 440.

In this composition, it is preferable that the content of the base oil be 70 to 95% by mass and the content of the additive be 0 to 10% by mass.

In particular, the composition is more preferably a lubricant composition for motor bearings having a consistency of 220 to 280.

Also, the composition of the second embodiment of the present invention is preferably a grease composition comprising:
- a base oil having a kinematic viscosity at 40° C. of 20 to 140 mm$^2$/s;
- at least one of carbon nanotubes (for example, single-walled or double-walled carbon nanotubes, in particular, single-walled carbon nanotubes) with a diameter of 0.4 to 9.0 nm in an amount of 0.001 to 3% by mass relative to the total mass of the composition;
- at least one dispersant selected from the group consisting of phosphate esters and amine salts of polyether ester acid in an amount of 0.08 to 1% by mass relative to the total mass of the composition;
- a diurea compound of the formula (1) as a thickener, in which any one of R1 and R3 is a cyclohexyl group and the other one is a saturated linear alkyl group having 8 or 18 carbon atoms, R2 is diphenylmethane diisocyanate, and a ratio of the cyclohexyl group to the total of the cyclohexyl group and the alkyl group is 30 to 88 mol %, wherein the composition may further comprise an additive, and
the composition has a consistency of 200 to 440.

In this composition, it is preferable that the content of the base oil be 70 to 95% by mass, the content of the thickener be 5 to 20%, and the content of the additive be 0 to 10% by mass.

In particular, the composition is more preferably a lubricant composition for motor bearings having a consistency of 220 to 280.

It is preferable to contain an antioxidant, in particular, an amine-based antioxidant as the additive, because it can extend the seizure life.

In particular, the composition of the second embodiment of the present invention is also preferably a composition comprising:
- a base oil having a kinematic viscosity at 40° C. of 20 to 140 mm$^2$/s;
- at least one of carbon nanotubes (for example, single-walled or double-walled carbon nanotubes, in particular, single-walled carbon nanotubes) with a diameter of 0.4 to 9.0 nm in an amount of 0.001 to 3% by mass relative to the total mass of the composition;
- at least one dispersant selected from the group consisting of phosphate esters and amine salts of polyether ester acid in an amount of 0.08 to 1% by mass based on the total mass of the composition; and
- at least one selected from the group consisting of melamine cyanurate, polyethylene wax, and polypropylene wax as a solid lubricant, wherein
the composition may further comprise an additive, and
the composition has a consistency of 200 to 440.

In this composition, it is preferable that the content of the base oil be 60 to 90% by mass, the content of the solid lubricant be 10 to 30%, and the content of the additive be 0 to 10% by mass.

In particular, the composition is more preferably a lubricant composition for motor bearings having a consistency of 220 to 280.

<Applications>

The lubricant composition of the present invention is usable for at least one selected from the group consisting of automobile parts, industrial machinery, and bearings.

As the automobile parts, there are constant-velocity joints, hub units, electric power steering, clutches, and the like.

As the industry machinery, there are reduction gears, power generators, rolling mill rolls, industrial robots, and the like.

As the bearings, there are motor bearings, pulley bearings, alternator bearings, and the like.

EXAMPLES

1. Preparation of Measurement Samples
(1) Preparation of Lubricant Compositions in Examples 1 to 9 and Comparative Examples 1 to 5

In a mixture oil of poly-α-olefin (PAO) and alkyl diphenyl ether oil (the mixture oil with a kinematic viscosity at 40° C.: 51.3 mm$^2$/s, measured in accordance with JIS K2283), 1 mole of 4',4-diphenylmethane diisocyanate and a total of 2 moles of cyclohexylamine and stearylamine (a molar ratio of cyclohexylamine:stearvlanine=7:1) were reacted with each other and were heated and cooled. To the obtained reaction product, the above mixture oil and carbon nanotubes or carbon black specified in Tables 1-1 and 1-2 were added in a ratio specified in Tables 1-1 and 1-2, followed by kneading with a three-roll mill to obtain a grease composition in each of Examples 1 to 9 and Comparative Examples 1 to 5.
(2) Preparation of Lubricant Compositions in Examples 10 to 20 and Comparative Examples 6 to 9

Grease compositions in Examples 10 to 20 and Comparative Examples 6 to 9 were obtained in the same method as the method (1) described above except that a dispersant was added together with the carbon nanotubes.
(3) The carbon materials used in Examples and Comparative Examples are as follows.

|  | Diameter | Length | Product Name | Manufacturer |
|---|---|---|---|---|
| Carbon Nanotubes | D = 1.2-2.0 nm | L = 5 μm or more | TUBALL | OCSIAL |
|  | D = 1.5-2.5 nm | L = 10 μm or less | EC1.5 | MEIJO NANO CARBON Co., Ltd. |
|  | D = 2.0-3.0 nm | L = 10 μm or less | EC2.0 | MEIJO NANO CARBON Co., Ltd |
|  | D = 3.0-5.0 nm | L = 100-600 μm | SG101 | Zeon Corporation |
|  | D = 9.5 nm | L = 1.5 μm | NC-3100 | Nanocyl |
|  | D = 110-170 nm | L = 5-9 μm | Carbon nanotube, multi-walled > 90% carbon basis, D × L 110-170 nm × 5-9 μm | Sigma-Aldrich |
| Carbon Black | D = 55 nm |  | #3030B | Mitsubishi Chemical Corporation |
|  | D = 40 nm |  | Ketjen Black EC300 | Lion Corporation |

(4) The dispersants used in Examples and Comparative Examples are as follows.
Phosphate ester: Disparlon D-375, Kusumoto Chemicals, Ltd.
Amino group-containing phosphate ester: Disparlon D-325, Kusumoto Chemicals, Ltd.
Amine salt of polyether ester acid: Disparlon D-234, Kusumoto Chemicals, Ltd.
Calcium sulfonate: NA-SUL 729, KING INDUSTRIES
Zinc sulfonate: NA-SUL ZS. KING INDUSTRIES
Succinimide: INFINEUM C9231, Infineum International Limited
Sorbitan trioleate: NONION OP-85R. NOF CORPORATION
Amino group-containing polyalkylene glycol: ESLEAM AD-508, NOF CORPORATION In Tables 1-1 to 2-2, the numbers in the fields of base oil, thickener, carbon material, and dispersant are expressed as % by mass based on the total mass of the composition.

2. Evaluation Items and Test Method (1) Consistency

The 60-stoke worked penetration of each of the obtained compositions was measured in accordance with JIS K 2220 7. The composition was determined as acceptable (○) when having a consistency of 200 to 440 or unacceptable (x) when having a consistency of less than 200 or more than 440. Tables 1-1 to 2-2 show the results.

(2) Evaluation of Electrolytic Corrosion Prevention Ability by Discharge Test

Figure 2:
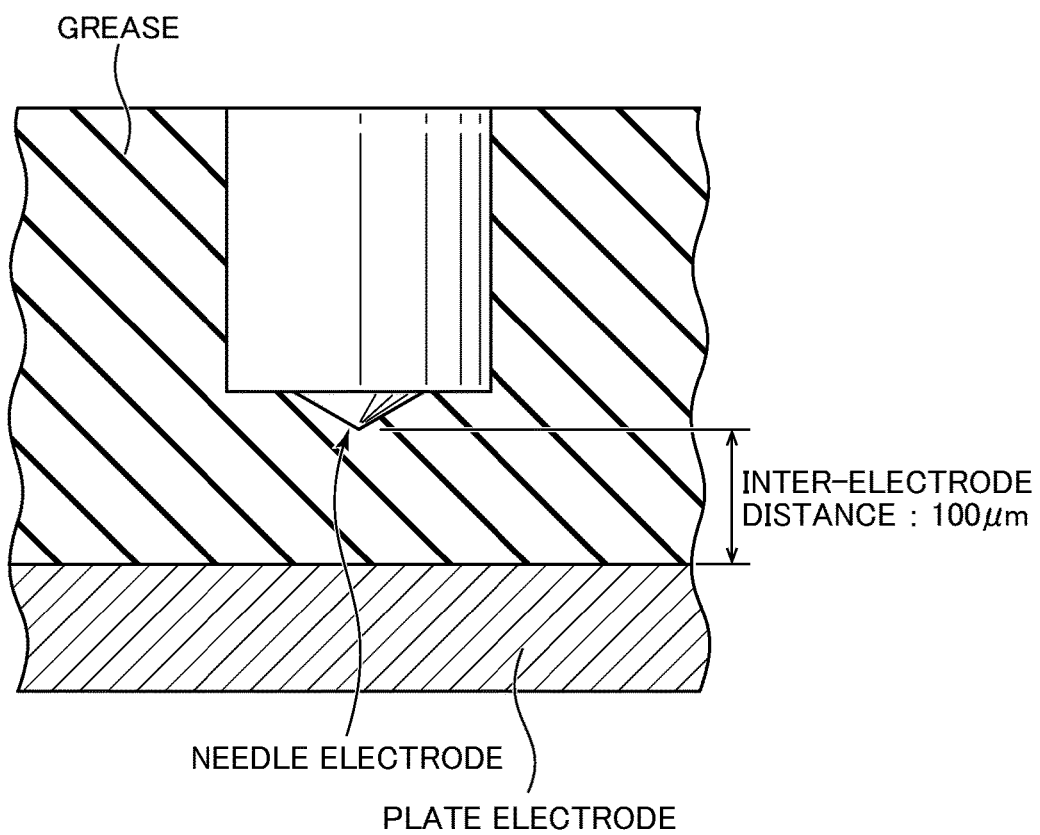
FIG. 2 is a schematic diagram of an electric discharge device used in Examples.

A voltage was applied between a needle and a plate electrode and whether electric discharge occurred was checked. The schematic view of the discharge test is as illustrated in FIG. 2. The needle was a cathode and the plate was an anode. The material for the needle was SCM435 steel and an apical angle of the needle was 120°. The needle was placed perpendicular to the anode plate and fixed at a position where the shortest distance between a spherical electrode provided at the tip of the needle and the anode top surface was 100 μm. The distance between the needle and the plate electrode was controlled by using a micrometer. The material for the anode plate was SPCC steel. The measurement sample was applied to a thickness of 10 to 15 mm onto the anode plate and the needle was inserted into the measurement sample. The anode plate and the cathode needle were connected with each other by a high voltage power source. The measurement sample was left for 30 seconds with a voltage of 5 kV applied, and was judged as acceptable (○) when no electric discharge occurred or unacceptable (x) when electric discharge occurred. Tables 1-1 to 2-2 show the results.

(3) Evaluation of Ability to Maintain Electrolytic Corrosion Prevention Ability by Discharge Test after Application of Shear In accordance with the Standard Test Method for Roll Stability of Lubricating Grease specified in ASTM D1831, 50 g of the measurement sample was applied into a cylinder, and was kneaded with a roll inserted into the cylinder under the conditions of 80° C. and 165 rpm for 100 hours, and thereby shear was applied to the measurement sample.

A voltage of 5 kV was applied to the measurement sample for 30 seconds in the same method as the method above described in the (2) discharge test, except that the needle was fixed at a position where the shortest distance between the needle and the plate electrode was 2000 μm. The measurement sample was judged as acceptable (○) when an average voltage in a period of 5-th to 30-th seconds after the start of the voltage application was lower than 1.0 kV or unacceptable (x) when the average voltage was 1.0 kV or higher or electric discharge occurred. Tables 2-1 and 2-2 shows the results.

(4) Evaluation of Acoustic Performance by Anderon Test Method

First, 0.8 g of the measurement sample prepared above was sealed in a deep groove ball bearing 6202, and the bearing was attached to an Anderon meter. While an axial load of 29.4 N was being applied, rotations were given at a rotational speed of 1,800 rpm for 60 seconds. An Anderon value of vibration transmitted to the outer ring during this test was measured by the Anderon meter. The measurement sample was judged as acceptable (○) when an Anderon value of 3.5 or greater was measured in 10 or less seconds during the entire test time of 60 seconds or unacceptable (x) when an Anderon value of 3.5 or greater was measured in more than 10 seconds. Tables 1-1 to 2-2 show the results.

(5) Evaluation of Electrical Property by Volume Resistivity Measurement

The volume resistivity indicates a ratio at 25° C. of a direct electric field (V/m) applied to a sample to a current per unit cross-sectional area applied to the sample at that time and is equal to the resistance between opposite faces of a 1 cm side cube of the sample. The specific volume resistivity was measured according to the electrical insulating oil test method specified in JIS C2101. Tables 1-1 to 2-2 show the results.

TABLE 1-1

|  |  |  |  |  | Example | | | | |
|---|---|---|---|---|---|---|---|---|---|
|  |  |  |  |  | 1 | 2 | 3 | 4 | 5 |
| Base Oil | Ether Oil, % by mass |  |  |  | 28.700 | 28.698 | 28.697 | 28.683 | 28.672 |
|  | PAO, % by mass |  |  |  | 53.299 | 53.297 | 53.294 | 53.268 | 53.248 |
| Thickener | Diurea (CHA:C18 = 7:1) |  |  |  | 18.000 | 18.000 | 18.000 | 18.000 | 18.000 |
| Carbon Material | Carbon Nanotubes, % by mass | D = 1.2-2.0 nm | L = 5 μm or more | Single-walled | 0.001 | 0.005 | 0.010 | 0.050 | 0.080 |
|  |  | D = 1.5-2.5 nm | L = 10 μm or less | Single-walled and Double-walled |  |  |  |  |  |
|  |  | D = 2.0-3.0 nm | L = 10 μm or less | Double-walled |  |  |  |  |  |
|  |  | D = 3.0-5.0 nm | L = 100-600 μm | Double-walled |  |  |  |  |  |
|  |  | D = 9.5 nm | L = 1.5 μm | Multi-walled |  |  |  |  |  |
|  |  | D = 110-170 nm | L = 5-9 μm | Multi-walled |  |  |  |  |  |
|  | Carbon Black, % by mass | D = 55 nm |  |  |  |  |  |  |  |
|  |  | D = 40 nm |  |  |  |  |  |  |  |
| Performance | Consistency |  |  |  | 222 | 220 | 212 | 204 | 201 |
|  | Discharge Test |  |  |  | No Discharge | No Discharge | No Discharge | No Discharge | No Discharge |

TABLE 1-1-continued

|  |  |  |  |  |  |
|---|---|---|---|---|---|
| Time with Anderon Value of 3.5 or more (sec) | 0 | 0 | 0 | 0 | 0 |
| Volume Resistivity, Ωcm | $2.2 \times 10^{13}$ | $6.3 \times 10^{13}$ | $1.4 \times 10^{13}$ | $7.3 \times 10^9$ | $1.7 \times 10^9$ |
| Judgment Consistency | ○ | ○ | ○ | ○ | ○ |
| Discharge Test | ○ | ○ | ○ | ○ | ○ |
| Time with Anderon Value of 3.5 or more (sec) | ○ | ○ | ○ | ○ | ○ |

| | | | | | Example | | | |
|---|---|---|---|---|---|---|---|---|
| | | | | | 6 | 7 | 8 | 9 |
| Base Oil | Ether Oil, % by mass | | | | 28.672 | 28.672 | 28.672 | 28.644 |
| | PAO, % by mass | | | | 53.248 | 53.248 | 53.248 | 53.196 |
| Thickener | Diurea (CHA:C18 = 7:1) | | | | 18.000 | 18.000 | 18.000 | 18.000 |
| Carbon Material | Carbon Nanotubes, % by mass | D = 1.2-2.0 nm | L = 5 μm or more | Single-walled | | | | 0.080 |
| | | D = 1.5-2.5 nm | L = 10 μm or less | Single-walled and Double-walled | 0.080 | | | |
| | | D = 2.0-3.0 nm | L = 10 μm or less | Double-walled | | 0.080 | | |
| | | D = 3.0-5.0 nm | L = 100-600 μm | Double-walled | | | 0.080 | |
| | | D = 9.5 nm | L = 1.5 μm | Multi-walled | | | | 0.080 |
| | | D = 110-170 nm | L = 5-9 μm | Multi-walled | | | | |
| | Carbon Black, % by mass | D = 55 nm | | | | | | |
| | | D = 40 nm | | | | | | |
| Performance | Consistency | | | | 200 | 201 | 216 | 255 |
| | Discharge Test | | | | No Discharge | No Discharge | No Discharge | No Discharge |
| | Time with Anderon Value of 3.5 or more (sec) | | | | 0 | 0 | 0 | 0 |
| | Volume Resistivity, Ωcm | | | | $2.0 \times 10^8$ | $6.8 \times 10^9$ | $3.0 \times 10^{12}$ | $1.8 \times 10^5$ |
| Judgment | Consistency | | | | ○ | ○ | ○ | ○ |
| | Discharge Test | | | | ○ | ○ | ○ | ○ |
| | Time with Anderon Value of 3.5 or more (sec) | | | | ○ | ○ | ○ | ○ |

TABLE 1-2

| | | | | | Comparative Example | | |
|---|---|---|---|---|---|---|---|
| | | | | | 1 | 2 | 3 |
| Base Oil | Ether Oil, % by mass | | | | 28.700 | 28.672 | 28.672 |
| | PAO, % by mass | | | | 53.300 | 53.248 | 53.248 |
| Thickener | Diurea (CHA:C18 = 7:1) | | | | 18.000 | 18.000 | 18.000 |
| Carbon Material | Carbon Nanotubes, % by mass | D = 1.2-2.0 nm | L = 5 μm or more | Single-walled | | | |
| | | D = 1.5-2.5 nm | L = 10 μm or less | Single-walled and Double-walled | | | |
| | | D = 2.0-3.0 nm | L = 10 μm or less | Double-walled | | | |
| | | D = 3.0-5.0 nm | L = 100-600 μm | Double-walled | | | |
| | | D = 9.5 nm | L = 1.5 μm | Multi-walled | | 0.080 | |
| | | D = 110-170 nm | L = 5-9 μm | Multi-walled | | | 0.080 |
| | Carbon Black, % by mass | D = 55 nm | | | | | |
| | | D = 40 nm | | | | | |
| Performance | Consistency | | | | 226 | 210 | 216 |
| | Discharge Test | | | | Discharge | Discharge | Discharge |
| | Time with Anderon Value of 3.5 or more (sec) | | | | 0 | 0 | 0 |
| | Volume Resistivity, Ωcm | | | | $1.0 \times 10^{14}$ | $3.6 \times 10^{12}$ | $2.7 \times 10^{11}$ |
| Judgment | Consistency | | | | ○ | ○ | ○ |
| | Discharge Test | | | | x | x | x |
| | Time with Anderon Value of 3.5 or more (sec) | | | | ○ | ○ | ○ |

| | | | | | Comparative Example | |
|---|---|---|---|---|---|---|
| | | | | | 4 | 5 |
| Base Oil | Ether Oil, % by mass | | | | 28.672 | 28.672 |
| | PAO, % by mass | | | | 53.248 | 53.248 |
| Thickener | Diurea (CHA:C18 = 7:1) | | | | 18.000 | 18.000 |
| Carbon Material | Carbon Nanotubes, % by mass | D = 1.2-2.0 nm | L = 5 μm or more | Single-walled | | |
| | | D = 1.5-2.5 nm | L = 10 μm or less | Single-walled and Double-walled | | |
| | | D = 2.0-3.0 nm | L = 10 μm or less | Double-walled | | |
| | | D = 3.0-5.0 nm | L = 100-600 μm | Double-walled | | |
| | | D = 9.5 nm | L = 1.5 μm | Multi-walled | | |
| | | D = 110-170 nm | L = 5-9 μm | Multi-walled | | |
| | Carbon Black, % by mass | D = 55 nm | | | 0.080 | |
| | | D = 40 nm | | | | 0.080 |
| Performance | Consistency | | | | 221 | 226 |
| | Discharge Test | | | | Discharge | Discharge |
| | Time with Anderon Value of 3.5 or more (sec) | | | | 22 | 11 |
| | Volume Resistivity, Ωcm | | | | $2.4 \times 10^{11}$ | $2.5 \times 10^{11}$ |

TABLE 1-2-continued

| Judgment | Consistency | ○ | ○ |
|---|---|---|---|
| | Discharge Test | x | x |
| | Time with Anderon Value of 3.5 or more (sec) | x | x |

TABLE 2-1

| | | | | Example | | | | | |
|---|---|---|---|---|---|---|---|---|---|
| | | | | 10 | 11 | 12 | 13 | 14 | 15 |
| Base Oil | Ether Oil | | | 31.437 | 31.437 | 31.437 | 31.437 | 31.437 | 31.437 |
| | PAO | | | 58.383 | 58.383 | 58.383 | 58.383 | 58.383 | 58.383 |
| Thickener | Diurea (CHA:C18 = 7:1) | | | 10.000 | 10.000 | 10.000 | 10.000 | 10.000 | 10.000 |
| Carbon Material | Carbon Nanotubes | D = 1.2-2.0 nm  L = 5 μm or more | Single-walled | 0.080 | 0.080 | 0.080 | 0.080 | 0.080 | 0.080 |
| | Carbon Black | D = 40 nm | | | | | | | |
| Dispersant | Phosphate Ester | | | 0.100 | | | | | |
| | Amino Ggroup-containing Phosphate Ester | | | | 0.100 | | | | |
| | Amine Salt of Polyether Ester Acid | | | | | 0.100 | | | |
| | Calcium Sulfonate | | | | | | 0.100 | | |
| | Zinc Sulfonate | | | | | | | 0.100 | |
| | Succinimide | | | | | | | | 0.100 |
| | Sorbitan Trioleate | | | | | | | | |
| | Amino Group-containing Polyalkylene Glycol | | | | | | | | |
| Performance | Consistency | | | 274 | 246 | 256 | 284 | 265 | 279 |
| | Electrolytic Corrosion Prevention Ability (Discharge or Not) | | | No | No | No | No | No | No |
| | Ability to Maintain Electrolytic Corrosion Prevention Ability (Average Voltage, kV) | | | 0.1 | 0.4 | 0.1 | 0.3 | 0.3 | 0.2 |
| | Acoustic Performance (Time with Anderon Value of 3.5 or more, sec) | | | 0 | 0 | 0 | 0 | 0 | 0 |
| | Electic Property (Volume Resistivity, Ωcm) | | | $9.4 \times 10^9$ | $1.1 \times 10^{10}$ | $3.2 \times 10^9$ | $3.0 \times 10^9$ | $4.7 \times 10^8$ | $3.5 \times 10^7$ |
| Judgment | Consistency | | | ○ | ○ | ○ | ○ | ○ | ○ |
| | Electrolytic Corrosion Prevention Ability | | | ○ | ○ | ○ | ○ | ○ | ○ |
| | Ability to Maintain Electrolytic Corrosion Prevention Ability | | | ○ | ○ | ○ | ○ | ○ | ○ |
| | Acoustic Performance | | | ○ | ○ | ○ | ○ | ○ | ○ |

| | | | | Example | | | | |
|---|---|---|---|---|---|---|---|---|
| | | | | 16 | 17 | 18 | 19 | 20 |
| Base Oil | Ether Oil | | | 31.437 | 31.437 | 27.720 | 34.300 | 32.900 |
| | PAO | | | 58.383 | 58.383 | 51.480 | 63.700 | 61.100 |
| Thickener | Diurea (CHA:C18 = 7:1) | | | 10.000 | 10.000 | 10.000 | — | — |
| Carbon Material | Carbon Nanotubes | D = 1.2-2.0 nm  L = 5 μm or more | Single-walled | 0.080 | 0.080 | 0.800 | 1.000 | 3.000 |
| | Carbon Black | D = 40 nm | | | | | | |
| Dispersant | Phosphate Ester | | | | | 10.000 | 1.000 | 3.000 |
| | Amino Ggroup-containing Phosphate Ester | | | | | | | |
| | Amine Salt of Polyether Ester Acid | | | | | | | |
| | Calcium Sulfonate | | | | | | | |
| | Zinc Sulfonate | | | | | | | |
| | Succinimide | | | | | | | |
| | Sorbitan Trioleate | | | 0.100 | | | | |
| | Amino Group-containing Polyalkylene Glycol | | | | 0.100 | | | |
| Performance | Consistency | | | 303 | 286 | 303 | 285 | 202 |
| | Electrolytic Corrosion Prevention Ability (Discharge or Not) | | | No | No | No | No | No |
| | Ability to Maintain Electrolytic Corrosion Prevention Ability (Average Voltage, kV) | | | 0.3 | 0.0 | 0.1 | 0.0 | 0.0 |
| | Acoustic Performance (Time with Anderon Value of 3.5 or more, sec) | | | 0 | 0 | 0 | 0 | 1 |
| | Electic Property (Volume Resistivity, Ωcm) | | | $2.2 \times 10^8$ | $3.7 \times 10^6$ | $1.6 \times 10^8$ | $2.2 \times 10^4$ | $5.8 \times 10^3$ |
| Judgment | Consistency | | | ○ | ○ | ○ | ○ | ○ |
| | Electrolytic Corrosion Prevention Ability | | | ○ | ○ | ○ | ○ | ○ |
| | Ability to Maintain Electrolytic Corrosion Prevention Ability | | | ○ | ○ | ○ | ○ | ○ |
| | Acoustic Performance | | | ○ | ○ | ○ | ○ | ○ |

TABLE 2-2

|  |  | Comparative Example | | | |
|---|---|---|---|---|---|
|  |  | 6 | 7 | 8 | 9 |
| Base Oil | Ether Oil | 31.500 | 31.472 | 33.950 | 31.500 |
|  | PAO | 58.500 | 58.448 | 63.050 | 58.500 |
| Thickener | Diurea (CHA:C18 = 7:1) | 10.000 | 10.000 |  |  |
| Carbon Material | Carbon Nanotubes D = 1.2-2.0 nm L = 5 μm or more Single-walled |  |  | 3.000 | 5.000 |
|  | Carbon Black D = 40 nm |  | 0.080 |  |  |
| Dispersant | Phosphate Ester |  |  |  | 5.000 |
|  | Amino Ggroup-containing Phosphate Ester |  |  |  |  |
|  | Amine Salt of Polyether Ester Acid |  |  |  |  |
|  | Calcium Sulfonate |  |  |  |  |
|  | Zinc Sulfonate |  |  |  |  |
|  | Succinimide |  |  |  |  |
|  | Sorbitan Trioleate |  |  |  |  |
|  | Amino Group-containing Polyalkylene Glycol |  |  |  |  |
| Performance | Consistency | 327 | 286 | 185 | 131 |
|  | Electrolytic Cotrosion Prevention Ability (Discharge or Not) | Yes | Yes | No | No |
|  | Ability to Maintain Electrolytic Corrosion Prevention Ability (Average Voltage, kV) | 5.0 | 5.0 | 0.0 | 0.0 |
|  | Acoustic Performance (Time with Anderon Value of 3.5 or more, sec) | 0 | 12 | 1 | 4 |
|  | Electic Property (Volume Resistivity, Ωcm) | $1.0 \times 10^{14}$ | $1.9 \times 10^{13}$ | $4.2 \times 10^{3}$ | $2.8 \times 10^{3}$ |
| Judgment | Consistency | ○ | ○ | x | x |
|  | Electrolytic Corrosion Prevention Ability | x | x | ○ | ○ |
|  | Ability to Maintain Electrolytic Corrosion Prevention Ability | x | x | ○ | ○ |
|  | Acoustic Performance | ○ | ○ | ○ | ○ |

What is claimed is:

1. A lubricant composition comprising:
a base oil; and
at least one of carbon nanotubes with a diameter of 0.4 to 9.0 nm in an amount of 0.001 to 0.08% by mass relative to a total mass of the composition,
wherein the composition has a worked penetration measured according to JIS K2220 7 of 200 dmm to 440 dmm.

2. A lubricant composition comprising:
a base oil;
at least one of carbon nanotubes with a diameter of 0.4 to 9.0 nm in an amount of 0.001 to 3% by mass relative to a total mass of the composition; and
a dispersant in an amount of more than 0% by mass and not more than 10% by mass relative to the total mass of the composition,
wherein the composition has a worked penetration measured according to JIS K2220 7 of 200 dmm to 440 dmm.

3. The lubricant composition according to claim 2, wherein the dispersant is an oiliness dispersant.

4. The lubricant composition according to claim 3, wherein the dispersant is at least one selected from the group consisting of phosphate esters or salts thereof, polyether ester acid or salts thereof, sulfonic acid or salts thereof, succinimide, sorbitan esters, and polyalkylene glycols.

5. The lubricant composition according to claim 1, wherein the carbon nanotubes are single-walled or double-walled.

6. The lubricant composition according to claim 1, wherein the base oil comprises at least one selected from the group consisting of mineral oils, synthetic hydrocarbon oils, phenyl ether oils, alkylbenzene oils, ester oils, polyglycol oils, silicone oils, fluorine oils, and ionic liquids.

7. The lubricant composition according to claim 1, further comprising a thickener.

8. The lubricant composition according to claim 7, wherein the thickener comprises at least one selected from the group consisting of soap-based thickeners, complex soap-based thickeners; urea-based thickeners; urethane-based thickeners; Na terephthalamate; organically modified bentonite; silica gel; fluorine-based powder; fibrous cellulose; and aramid fiber.

9. The lubricant composition according to claim 1, which is for use in an automobile part, industrial machinery, or a bearing.

10. An automobile part, industrial machinery, or a bearing in which the composition according to claim 1 is enclosed.

11. The lubricant composition according to claim 2, wherein the carbon nanotubes are single-walled or double-walled.

12. The lubricant composition according to claim 2, wherein the base oil comprises at least one selected from the group consisting of mineral oils, synthetic hydrocarbon oils, phenyl ether oils, alkylbenzene oils, ester oils, polyglycol oils, silicone oils, fluorine oils, and ionic liquids.

13. The lubricant composition according to claim 2, further comprising a thickener.

14. The lubricant composition according to claim 12, wherein the thickener comprises at least one selected from the group consisting of soap-based thickeners, complex soap-based thickeners; urea-based thickeners; urethane-based thickeners; Na terephthalamate; organically modified bentonite; silica gel; fluorine-based powder; fibrous cellulose; and aramid fiber.

15. An automobile part, industrial machinery, or a bearing in which the composition according to claim 2 is enclosed.

16. The lubricant composition according to claim 8, wherein the thickener is a diurea compound represented by formula (1):

$$R1-NHCONH-R2-NHCONH-R3 \quad (1)$$

wherein R2 is a divalent aromatic hydrocarbon group having 6 to 15 carbon atoms, and R1 and R3, which may be the same or different, are each a saturated or unsaturated alkyl group having 6 to 30 carbon atoms, an aryl group having 6 or 7 carbon atoms, or a cyclohexyl group.

17. The lubricant composition according to claim 16, wherein any one of R1 and R3 is an alkyl group having 6 to 30 carbon atoms and the other one is a cyclohexyl group.

18. The lubricant composition according to claim 16, wherein any one of R1 and R3 is a cyclohexyl group, the other one is a saturated linear alkyl group having 8 or 18 carbon atoms, and a ratio of the cyclohexyl group to a total of the cyclohexyl group and the alkyl group is 10 to 90 mol %.

* * * * *